(12) United States Patent
Pfeiffer et al.

(10) Patent No.: US 7,893,819 B2
(45) Date of Patent: Feb. 22, 2011

(54) METHOD AND DEVICE FOR AVOIDING A COLLISION IN A LANE CHANGE MANEUVER OF A VEHICLE

(75) Inventors: Jürgen Pfeiffer, Glashütten (DE); Stefan Lüke, Olpe (DE); Dirk Fröhlich, Bürstadt (DE); Maxim Arbitmann, Rochester Hills, MI (US)

(73) Assignee: Continetntal Teves AG & Co, oHG, Frankfurt (DE)

( * ) Notice: Subject to any disclaimer, the term of this patent is extended or adjusted under 35 U.S.C. 154(b) by 547 days.

(21) Appl. No.: 11/885,063

(22) PCT Filed: Mar. 2, 2006

(86) PCT No.: PCT/EP2006/060413

§ 371 (c)(1),
(2), (4) Date: May 21, 2008

(87) PCT Pub. No.: WO2006/092431

PCT Pub. Date: Sep. 8, 2006

(65) Prior Publication Data

US 2009/0212930 A1 Aug. 27, 2009

(30) Foreign Application Priority Data

Mar. 3, 2005 (DE) .................. 10 2005 010 325
Mar. 2, 2006 (DE) .................. 10 2006 010 275

(51) Int. Cl.
*B60Q 1/00* (2006.01)

(52) U.S. Cl. ................. 340/435; 340/436; 340/438; 701/301

(58) Field of Classification Search ............ 340/435, 340/436, 437, 438, 425.5; 701/209, 301, 701/1, 36, 41

See application file for complete search history.

(56) References Cited

U.S. PATENT DOCUMENTS

| | | | |
|---|---|---|---|
| 5,479,173 A * | 12/1995 | Yoshioka et al. | 342/70 |
| 5,521,579 A | 5/1996 | Bernhard | |
| 6,038,496 A | 3/2000 | Dobler et al. | |
| 6,388,565 B1 | 5/2002 | Bernhard et al. | |
| 7,016,783 B2 * | 3/2006 | Hac et al. | 701/301 |
| 7,038,577 B2 * | 5/2006 | Pawlicki et al. | 340/435 |
| 2002/0067287 A1 | 6/2002 | Delcheccolo et al. | |

(Continued)

FOREIGN PATENT DOCUMENTS

DE 19526452 10/1996

(Continued)

Primary Examiner—Toan N Pham

(57) ABSTRACT

Disclosed is a method for avoiding a collision in a lane change maneuver of a vehicle to a target lane, where objects in a lateral rearward space of the vehicle are detected by an ambience monitoring device and measures are taken to influence the vehicle. The method is characterized in that graded measures are provided that depending on their stage, involve warning the driver and/or intervening into a steering system of the vehicle and/or influencing safety devices. The measures of a selected stage are initiated, with the stage being determined depending on a relative position of a detected object with regard to the vehicle and/or a relative speed between the vehicle and the detected object as well as depending on the fulfillment of a lane change condition. Also disclosed is a device that is well suited to implement the method.

35 Claims, 1 Drawing Sheet

U.S. PATENT DOCUMENTS

| | | | |
|---|---|---|---|
| 2003/0025597 A1* | 2/2003 | Schofield | 340/435 |
| 2003/0156015 A1* | 8/2003 | Winner et al. | 340/425.5 |
| 2004/0215393 A1 | 10/2004 | Matsumoto et al. | |
| 2005/0017857 A1 | 1/2005 | Rao et al. | |
| 2005/0242932 A1 | 11/2005 | Schneider et al. | |
| 2007/0165908 A1 | 7/2007 | Braeunl et al. | |
| 2009/0284360 A1* | 11/2009 | Litkouhi | 340/439 |

FOREIGN PATENT DOCUMENTS

| | | |
|---|---|---|
| DE | 19845568 | 10/1999 |
| DE | 10336986 | 3/2005 |
| DE | 10345680 | 5/2005 |
| DE | 10200428613 | 12/2005 |
| EP | 0443185 | 8/1991 |
| EP | 1312506 | 5/2003 |
| EP | 1470957 | 10/2004 |
| EP | 1490248 | 12/2005 |
| WO | 2005014370 | 2/2005 |

* cited by examiner

METHOD AND DEVICE FOR AVOIDING A COLLISION IN A LANE CHANGE MANEUVER OF A VEHICLE

BACKGROUND OF THE INVENTION

The present invention relates to a method for avoiding a collision in a lane change maneuver of a vehicle from an instantaneous lane to a target lane, where objects in a lateral rearward space of the vehicle are detected by means of an ambience monitoring device and measures are taken to influence the vehicle.

The invention further relates to a device that is appropriate to implement the method.

For example, methods with the name 'lane change assist system' have become known, where the driver of a motor vehicle is assisted in a lane change. More particularly, an alarm to the driver is triggered by this method when the danger of a possible collision of the vehicle with an object is detected, which has been sensed by means of a suitable ambience monitoring device.

More particularly, German patent DE 43 13 568 C1 discloses a method of guidance for a lane change maneuver from an instantaneous lane to an adjacent target lane. To this end, the front space and the rear space of at least the adjacent target lane is monitored for the desired lane change, the distances from objects being detected there, especially vehicles, and their speeds are measured, and safety distances are calculated based on this data. When all distances measured are in excess of the calculated safety distances, this is identified as a possible lane change. During cornering maneuvers, the steering angle is used to allocate the detected objects to the respective lane.

German patent DE 195 26 452 C1 describes a lateral rearward space monitoring device, where an alarm signal is generated when an object is sensed in a lateral rearward space of the vehicle, which is moving at higher speed than one's own vehicle and a lane change is requested, which is detected by way of a turn indicator position or a steering angle position.

Further, German patent DE 195 07 957 C1 discloses a vehicle with an optical scanning device for a lateral range of the road. The scanning device comprises several infrared transmitting elements arranged side by side and an associated CCD array as well as a subsequent evaluating unit, which is designed both for contrast control and for contour detection. This system is used to scan the road surface in order to determine a respective road limitation and to trigger an alarm signal when leaving the roadway.

Arrangements have been made in the prior art systems that a predefined alarm signal is generated in the event of an intended lane change, when a faster vehicle is in the lateral rearward range of one's own vehicle. In particular when the overtaking vehicle is approaching only slowly, alarm signals will often be triggered even if the situation is mastered by the driver.

The shortcoming involved is that the driver is inclined to a reduced acceptance of the alarm signals and ignores the alarm signals. In the following, the alarm signals are felt to be disturbing, and the risk rises that the driver will perform lane changes even at a highly increased danger of collision in spite of the alarm signals.

In addition, there is often the problem that a danger situation develops very dynamically so that the driver is not in a position to react with a sufficient rate of rapidity to the alarm, steering the vehicle into a dangerous area.

In view of the above, an object of the invention is to better adapt measures for the prevention of a collision of the vehicle during lane change to the danger of collision that prevails depending on the situation.

SUMMARY OF THE INVENTION

According to the invention, this object is achieved by a method for avoiding a collision in a lane change maneuver of a vehicle from an instantaneous lane to a target lane, where objects in a lateral rearward space of the vehicle are detected by means of an ambience monitoring device and measures are taken to influence the vehicle. Graded measures are provided that depending on their stage, involve warning the driver and/or intervening into a steering system of the vehicle (1) and/or influencing safety devices. The measures of a selected stage are initiated, with the stage being determined depending on a relative position of a detected object (4) with regard to the vehicle (1) and/or a relative speed between the vehicle (1) and the detected object (4) as well as depending on the fulfillment of a lane change condition. The object is also achieved by a device for avoiding a collision in a lane change maneuver of a vehicle to a target lane, the device having an ambience monitoring device that is used to sense objects in a lateral rearward space of the vehicle. The device is equipped with a danger computer enabling to initiate graded measures to influence the vehicle (1), with the measures, corresponding to their stage, involving warning the driver and/or intervening into a steering system of the vehicle (1) and/or influencing safety devices, and in that the danger computer allows initiating measures of a stage, which can be determined depending on a relative position of a detected object (4) with regard to the vehicle (1) and/or a relative speed between the vehicle (1) and the detected object (4) as well as depending on the fulfillment of a lane change condition.

Accordingly, it is arranged that a method of the type mentioned hereinabove is performed in such a manner that graduated measures are provided, the said measures, depending on their stage, involving warning the driver and/or intervening into a steering system of the vehicle and/or influencing safety means, and that the measures of a selected stage are initiated, with the stage being determined depending on a relative position of a detected object with regard to the vehicle and/or a relative speed between the vehicle and the detected object as well as depending on the fulfillment of a lane change condition.

Furthermore, it is provided to configure the device for avoiding a collision in a lane change maneuver of a vehicle to a target lane, comprising an ambience monitoring device that is used to sense objects in a lateral rearward space of the vehicle and to take measures to influence the vehicle, in such a fashion that it is equipped with a danger computer enabling to initiate graded measures to influence the vehicle, with the measures, corresponding to their stage, involving warning the driver and/or intervening into a steering system of the vehicle and/or influencing safety means, and that the danger computer allows initiating measures of a stage, which can be determined depending on a relative position of a detected object with regard to the vehicle and/or a relative speed between the vehicle and the detected object as well as depending on the fulfillment of a lane change condition.

The idea of the invention is to perform graded measures to avoid a collision in a lane change or to enhance the safety of the vehicle occupants in an imminent collision due to a lane change, which measures are adapted to the present traffic situation being determined based on the relative position and/or the relative speed between the vehicle and a detected object. In particular, the driver can be informed in a first alert stage already about an existing, yet insignificant danger of collision, while in a higher alert stage there is an express warning by suitable collision-avoiding measures that a collision is impending when a lane change is intended.

The acceptance of the collision-avoiding measures by the driver is hereby enhanced, and it is avoided that the driver will ignore the measures taken in a thoughtless manner when there is a major danger potential. Besides, more effective measures to prevent a collision or to diminish the consequences of a collision can be taken in a higher alert stage, when the driver has initiated a lane change in spite of the measures taken in a lower alert stage.

In a favorable embodiment of the method of the invention and the device of the invention, it is provided that a shape of the road in the rearward space of the vehicle is found out based on sensing the lateral rearward space of the vehicle by means of the ambience monitoring device.

Another favorable embodiment of the method of the invention and the device of the invention is characterized in that a path of the detected object is predicted depending on the position of the detected object with regard to the vehicle, the relative speed between the detected object and the vehicle, as well as the shape of the road.

In addition, it is favorably arranged that a road marking separating the instantaneous lane of the vehicle from the target lane is sensed by means of the ambience monitoring device.

A preferred embodiment of the method of the invention and the device of the invention includes that a detected object is allocated to the target lane based on the relative position of the object with regard to the vehicle and based on the shape of the road.

This allows performing an especially reliable evaluation of the danger of a collision with a detected object even if the object is disposed in the rearward space of the vehicle at a large distance from the vehicle.

In a preferred embodiment of the method of the invention and the device of the invention, an optical alarm signal is triggered when, on account of a lane change to a target lane, a longitudinal distance between the vehicle and an object detected within the target lane would become shorter than a predetermined minimum distance.

Thus, an optical alarm signal makes the driver initially aware of the danger in the event of a possible lane change. In this respect, it has been found out that the driver perceives the signal as additional information about traffic conditions and does not consider it as disturbing.

The longitudinal distance between the motor vehicle and an object implies the distance measured along the determined shape of the road under the invention, which distance differs from the distance measured in the longitudinal direction of the vehicle in case the road has curves.

Preferably, the optical alarm signal is triggered by switching on a lamp element integrated into an exterior rearview mirror of the vehicle.

Thus, the driver perceives the optical alarm signal in particular when he/she looks into the exterior rearview mirror of the vehicle in order to check the possibility of a lane change and is made aware of the possible danger in a lane change.

Another favorable design of the invention is characterized in that the optical alarm signal is triggered by switching on a lamp element arranged at an A-column of the vehicle.

As a result, the lamp element for the optical warning of the driver is arranged in the lateral field of vision of the driver, even if he/she is looking straight ahead. Thus, the driver is supported constantly in the decision when lane changes should not be made.

Another preferred embodiment of the method of the invention involves that an audible alarm signal is triggered when, on account of a lane change to the target lane, the longitudinal distance between the vehicle and the object detected within the target lane would become shorter than a predetermined minimum distance and when a first lane change condition is satisfied.

If an intention of the driver to perform a lane change is identified because the first lane change condition is satisfied, the danger of a collision in a lane change is pointed out to the driver by the audible alarm signal more noticeably, especially more noticeably than by the optical alarm signal.

In an appropriate manner, the audible alarm signal is triggered in that at least one vehicle loudspeaker is induced to emit a warning sound.

In addition, the vehicle loudspeaker is arranged on the vehicle side directed towards the target lane in a favorable embodiment of the method of the invention and the device of the invention.

This makes the driver intuitively aware that a danger is imminent from the direction into which he/she intends to steer the vehicle in the lane change, and he/she is, hence, induced to perform an additional check of the possibilities of a lane change and to not initiate the lane change, as the case may be.

A suitable embodiment of the method of the invention and the device of the invention is characterized in that the first lane change condition is satisfied when the driver activates a direction sign on the vehicle side directed towards the target lane.

A still more noticeable warning of the driver is appropriate when the driver, in addition to the activation of the direction sign, undertakes additional actions to perform a lane change.

In a preferred embodiment of the method of the invention and the device of the invention, it is therefore provided that a haptic alarm signal is triggered when, due to a lane change to the target lane, the longitudinal distance between the vehicle and the object detected within the target lane would become shorter than a predetermined minimum distance and when a second lane change condition is satisfied.

A favorable embodiment of the method of the invention and the device of the invention provides in addition that the second lane change condition is satisfied when a distance between the vehicle and a road marking that is disposed on the vehicle side directed towards the target lane decreases during a predetermined period and/or below a predetermined minimum distance.

Such a lane change condition allows determining in a particularly reliable fashion whether the driver initiates the lane change by a steering movement.

In particular in the case that no lane markings are provided or can be detected, it is provided in another favorable embodiment of the method of the invention and the device of the invention that the second lane change condition is satisfied when a lateral distance between the vehicle and a detected object that is allocated to the target lane decreases during a predetermined period and/or below a predetermined minimum distance.

Preferably, the lateral distance means a lateral distance between the object and the vehicle, which is predicted on account of the calculation of the path of the object for the point of time when the object is level with the vehicle.

Preferably, an embodiment of the method of the invention and the device of the invention implies that the haptic alarm signal is triggered in that a steering torque that changes the direction is applied to a steering handle of the vehicle.

Due to a haptic alarm signal of this type, the driver intuitively notices that an increased collision danger exists due to his steering movements for initiating a lane change.

In addition, a particularly favorable embodiment of the method of the invention and the device of the invention is characterized in that a danger potential is determined depending on the longitudinal distance, which would develop due to a lane change to the target lane between the vehicle and the object detected within the target lane, as well as depending on a relative speed between the vehicle and the detected object.

As regards the danger potential, a quantity is determined, which is a standard of the likelihood of a collision due to a lane change. Thus, the danger potential allows a more extensive evaluation of the existing traffic situation.

A favorable embodiment of the method of the invention and the device of the invention is characterized in that, based on the shape of a road, a position of the vehicle within its lane is determined, and that the danger potential is determined depending on the position of the vehicle in its lane.

This way, the distance from the road markings is taken into account in the warning or intervention strategy as well.

Preferably, it is provided in addition that the danger potential is determined depending on the speed of the vehicle.

Further, it is preferably provided that the danger potential is determined depending on a yaw rate of the vehicle.

In addition, a favorable embodiment of the method of the invention and the device of the invention is characterized in that the danger potential is determined depending on a steering angle of steerable wheels of the vehicle.

Furthermore, it is arranged in a favorable embodiment of the method of the invention that the danger potential is determined depending on a steering angle velocity and/or a steering torque generated by the driver of the vehicle.

In a favorable embodiment of the method of the invention and the device of the invention, the danger potential is used to adapt the extent or the distinctness of the haptic warning to the danger level in a lane change that exists due to the present traffic situation.

It is advantageously arranged in this embodiment that the haptic alarm signal is triggered for a period, which is defined depending on the existing danger potential.

Furthermore, a favorable embodiment of the method of the invention and the device of the invention is characterized in that a steering torque that is invariable in terms of direction is applied to the steering handle in order to return the vehicle completely into the instantaneous lane or to keep it in the lane when, on account of a lane change to the target lane, the longitudinal distance between the vehicle and a detected object within the target lane would become shorter than a predetermined minimum distance, when the second lane change condition is satisfied, and when the danger potential exceeds a first threshold value.

By way of the direction-constant steering torque, a steering recommendation is given to the driver for the return of the vehicle into its original lane or for keeping the vehicle in the lane when there is a danger of collision during a lane change on account of a high value of the danger potential. This is very advantageous especially when a danger situation is developing with such a high dynamics that the driver cannot react to a previous alarm with a sufficient rate of rapidity.

Equally, however, the driver can disregard such an intervention into the steering system of the vehicle and perform the lane change despite the intervention, if desired. He/she is hereby able, for example, when riding towards the end of a traffic jam, to avoid a frontal impact on the end of the traffic jam and, instead, risk or put up with a lateral collision, which has less serious consequences in general.

With respect to such a situation, it is furthermore arranged in a favorable embodiment of the method of the invention and the device of the invention that an additional object-sensing device is used to detect a distance between the vehicle and an object in the space in front of the vehicle, and that a direction-constant torque is applied to the steering handle only when no object is detected in front of the vehicle, whose distance from the vehicle is less than a predetermined minimum distance.

Thus, the driver can escape without hindrance when a frontal collision is imminent and can prefer a lateral collision with less serious consequences to the front collision.

Preferably, it is provided that the minimum distance is determined depending on a relative speed between the vehicle and an object detected in the space in front of the vehicle.

Another preferred embodiment of the method of the invention and the device of the invention resides in that at least one reversible safety means of the vehicle is influenced when, on account of a lane change to the target lane, the longitudinal distance between the vehicle and the object detected within the target lane would become shorter than a predetermined minimum distance, when the second lane change condition is satisfied, and when the danger potential exceeds a second threshold value.

Favorably, the vehicle in this embodiment is prepared for a collision by an activation of reversible safety means, when the driver has initiated a lane change and a collision is considered very likely due to a very high value of the danger potential. This enhances the occupant safety in an impending collision.

It is preferably arranged then that the second threshold value is higher than the first threshold value.

It is preferably also arranged that at least one reversible safety means of the vehicle is influenced when it is found out on account of the predicted path of the object that the object is on a collision course with the vehicle and a collision with the vehicle has to be expected within a first time to collision.

This way, the vehicle is prepared by an activation of reversible safety means for a collision with an object, which in turn is on a collision course with the vehicle even without the driver performing a lane change.

In a favorable embodiment of the method of the invention and the device of the invention, the reversible safety means is a reversible seat belt pretensioning system.

In another favorable embodiment of the method of the invention and the device of the invention, the reversible safety means is at least one actuator serving to change a seat position of the driver and/or front passenger of the vehicle.

Still another favorable embodiment of the method of the invention and the device of the invention is characterized in that the reversible safety means is at least one actuator serving to close the sliding roof and/or a window of the vehicle.

In addition, another preferred embodiment of the method of the invention and the device of the invention is characterized in that an irreversible safety means of the vehicle is influenced when, on account of a lane change to the target lane, the longitudinal distance between the vehicle and the object detected within the target lane would become shorter than a predetermined minimum distance, when the second lane change condition is satisfied, and when the danger potential exceeds a third threshold value.

In this embodiment, the vehicle is prepared for a collision by influencing irreversible safety means, and the collision is considered as being almost inevitable on account of an especially high value of the danger potential, in order to increase the safety of the occupants of the vehicle still further.

Preferably, the third threshold value is higher than the second threshold value in this arrangement.

In addition, a favorable embodiment of the method of the invention and the device of the invention provides that at least one irreversible safety means of the vehicle is influenced when it is detected on account of the predicted path of the object that the object is on a collision course with the vehicle and a collision with the vehicle has to be expected within a second time to collision.

As a result, the vehicle is prepared for a collision with an object, which is almost inevitable on account of a very short time to collision, by influencing irreversible safety means, the said object in turn being on a collision course with the vehicle.

It is preferably provided that the second time to collision is shorter than the first time to collision.

An expedient embodiment of the method of the invention and the device of the invention provides that the irreversible safety means is influenced by changing activation criteria of the irreversible safety means.

It is favorably arranged that the irreversible safety means is an air bag.

In another especially preferred embodiment of the method of the invention and the device of the invention, it is provided that the ambience monitoring device is a camera system comprising two camera sensors.

It is preferably arranged that one camera sensor each is arranged at a vehicle side.

In addition, a favorable embodiment of the method of the invention and the device of the invention is characterized in that the camera sensors are integrated into the exterior rearview mirrors of the vehicle.

It is arranged in another favorable embodiment of the method of the invention and the device of the invention that the ambience monitoring device comprises a camera sensor directed to the rearward space of the vehicle and a short-range sensor on each vehicle side, and objects in a lateral area of the vehicle can be detected by means of the short-range sensors.

Furthermore, a favorable embodiment of the method of the invention and the device of the invention is characterized in that the lateral camera sensors or the camera sensor directed to the rearward space of the vehicle can also be employed to measure a parking gap.

Thus, the ambience monitoring device is well suited for several application purposes, and in particular a parking aid function can be performed by means of the ambience monitoring device in addition to the lane change assist function of the invention.

In order to utilize existing hardware resources as efficiently as possible, a favorable embodiment of the method of the invention and the device of the invention provides that the danger computer is also designed to the end of determining a size of a parking gap and/or a relative position of the parking gap with respect to the vehicle due to signals of the lateral camera sensors or the camera sensor directed to the rearward space of the vehicle.

Another favorable embodiment of the method of the invention and the device of the invention involves that the danger computer is also designed to determine a path of the vehicle for negotiating the parking gap starting from a start position by way of the signals of the lateral camera sensors or the camera sensor, which is directed to the rearward space of the vehicle.

Further advantages, special features, and suitable improvements of the method of the invention and the device of the invention can be taken from the following description of preferred embodiments with reference to the FIGURE.

DETAILED DESCRIPTION OF THE DRAWING

Figure 1:
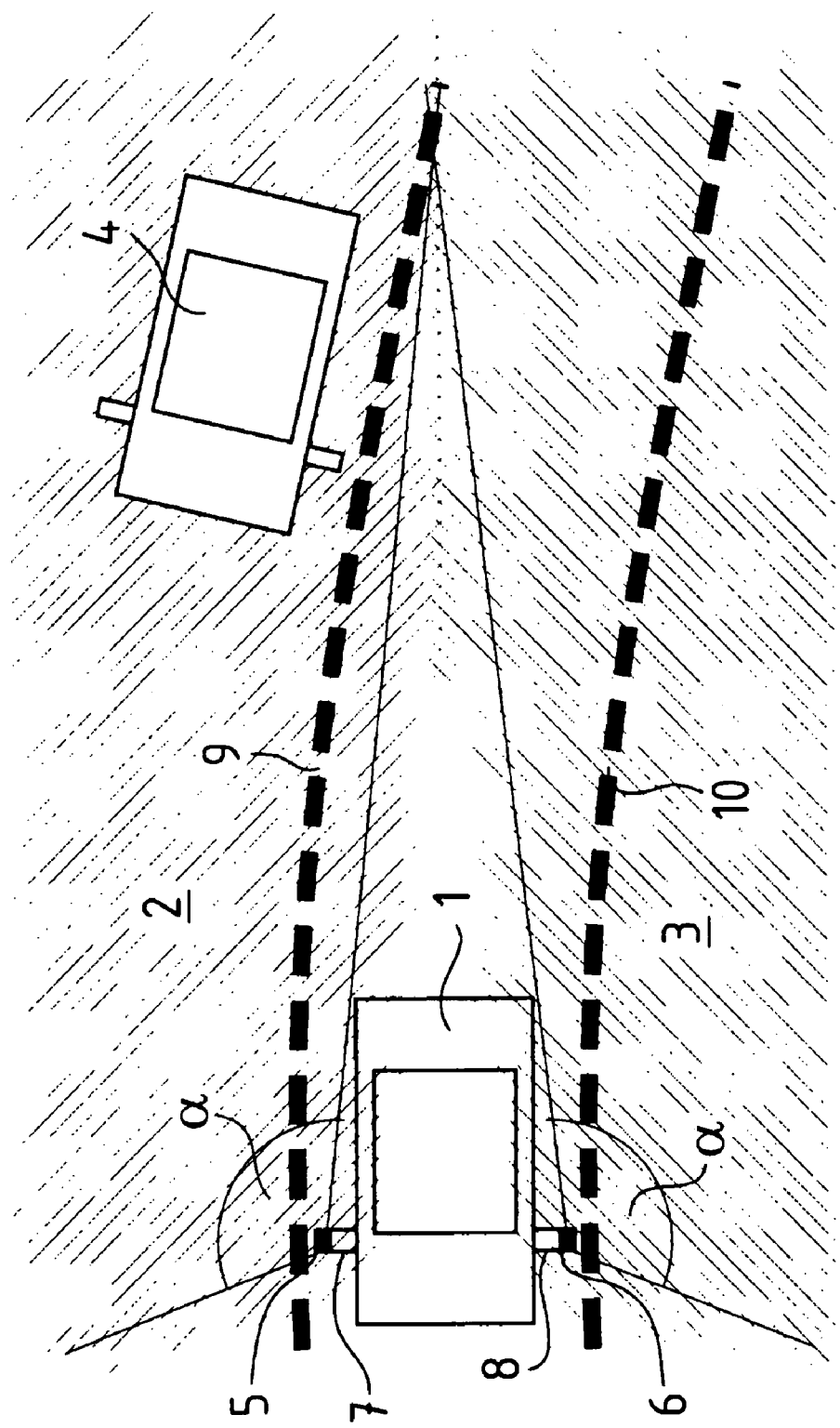
FIG. 1 shows the horizontal coverage of an ambience monitoring device of a vehicle.

The invention provides a lane change assist function, which informs the driver of a motor vehicle about the collision danger in a possible or already intended lane change with the aid of graded measures and prevents a collision by taking appropriate measures, or initiates measures to enhance the occupant safety when a collision is impending. The function relates to the danger of a collision with an overtaking vehicle or with a vehicle that has been overtaken, or with a vehicle that is in the so-called blind spot range of the motor vehicle 1. It is especially suitable when driving at high speed on a country road or expressway, but it can principally be employed in city traffic as well.

In order to perform the monitoring operation of the lateral rearward space 2, 3 of the motor vehicle 1 as provided under the invention, the motor vehicle includes a suitable ambience monitoring device. Another motor vehicle 4 is shown in the schematic view in FIG. 1 as an object to be sensed in the lateral rearward space 2.

The use of a camera system has proven especially favorable for ambience monitoring, which comprises two camera sensors 5, 6 being integrated into the exterior rearview mirrors 7, 8 of the motor vehicle and having an angular coverage α of about 120°. The camera sensors 5, 6 not only allow sensing objects in the lateral rearward space 2, 3 of the motor vehicle 1 and determining the positions of the detected objects relative to the motor vehicle 1 and the relative speeds between the motor vehicle 1 and the detected objects, but also allow sensing road markings 9, 10 in the lateral range of the motor vehicle 1 and sensing the shape of a road or he lanes in the rearward space of the motor vehicle 1. Further, the use of camera sensors is advantageous in that also objects can be detected, which are at a large distance from the motor vehicle 1.

The pictures of the cameras are sent to a danger computer, which analyses the lateral rearward space 2, 3 of the motor vehicle 1 and determines relevant quantities of the detected objects by way of the pictures and by way of vehicle quantities such as the vehicle speed, the yaw rate and the steering angle, which are sensed by corresponding vehicle sensors or are calculated from the measuring signals of vehicle sensors, respectively. The evaluation of the camera pictures is more particularly based on a contrast measurement and a contour and pattern detection in the pictures or on the method of the optical flux.

When evaluating the camera pictures, the relative positions of the detected objects with regard to the motor vehicle 1 are determined in the danger computer and are referred to the data obtained about the shape of the road, with the detected objects being allocated to a lane. Further, the relative speeds between the detected objects and the motor vehicle 1 are determined, and the distance to be covered by the detected objects until they have reached the motor vehicle 1 is found out by means of the determined course of the lane in the rearward space of the motor vehicle. The path of the detected objects is then predicted based on this information.

Based on the evaluation of the camera pictures, it can thus be calculated at what times the detected objects are at what longitudinal distances from the motor vehicle 1 and in which lane the detected objects are moving. Within the limits of the invention, the longitudinal distance between the motor vehicle and an object implies the distance measured along the determined shape of a road, which differs from the distance measured in the longitudinal direction of the vehicle when the road has curves.

Determining the lane is significant especially on roads having more than two lanes. Based on the allocation of the detected objects to the existing lanes, it can be found out whether an object is disposed in the target lane in a lane change maneuver, for which a collision with the motor vehicle 1 is imminent. Thus, e.g. spurious alarms are avoided on a three-lane road, which could be triggered in the event of a lane change from the right lane to the middle lane when a vehicle is approaching from the rear on the left lane.

In addition, the camera pictures allow detecting also the position of the motor vehicle 1 in its lane, i.e. in particular the distance of the motor vehicle 1 from the road markings on the left and right vehicle side as well as the total width of the lane.

In case lane markings 9, 10 are missing or if they cannot be sensed, a lateral distance between the objects and the motor vehicle 1, which is predicted based on the calculation of the object paths for the time in which the objects are level with the motor vehicle 1, can be taken into account to perform the lane change assist function, instead of the allocation of the motor vehicle 1 and the detected objects to the lanes defined by the road markings 9, 10. This lateral distance can be used to allocate the detected objects likewise to a lane, and a lane in this case corresponds to a road area with a predetermined lateral extension at the side of the motor vehicle 1.

Based on the above-mentioned data being determined for each of the detected objects, the danger computer determines the objects that move in the adjacent lane or, when reaching the motor vehicle 1, have a lateral distance from the motor vehicle that is shorter than a minimum distance that corresponds roughly to the width of a lane. These are the objects, with which the motor vehicle 1 can possibly collide in a lane change.

Besides, also those objects are determined, which are on a collision course with the vehicle when the present lane and the present driving speed are maintained, meaning the objects moving actively towards the vehicle.

In addition, the danger computer determines for the objects the time until a collision, which could occur due to a lane change to the corresponding adjacent target lane or due to a present collision course of the objects and of the vehicle and which is referred to as time to collision (TTC) in the following.

A danger potential for the objects with regard to a lane change is calculated based on the time to collision and preferably based on additional data such as the distance of the motor vehicle 1 from the road marking between the lanes, in which the motor vehicle itself and the object are moving, or the lateral distance between the motor vehicle 1 and the detected object predicted for the instant of collision which occurs when no lane change is performed, and the relative speed between the motor vehicle 1 and the object. Preferably, the steering angle at the steerable wheels of the vehicle, the steering angle velocity and the steering torque generated by the driver are included in the determination of the danger potential. The danger potential is a standard of the likelihood that the motor vehicle 1 will collide with the object due to a lane change and allows a more extensive assessment of the traffic situation in view of possible collisions, especially in a lane change.

Besides, a collision course prevention can be defined based on an object model and the path prediction for the objects and the vehicle, which is included in the danger computer as an additional assessed value for the assessment and is a standard of the quality of prediction of the paths of the detected objects. Preferably, it is arranged that an object is rated as dangerous only if the collision course prevention for this object exceeds a defined threshold value.

Instead of the two camera sensors 5, 6, the ambience monitoring device of the invention can dispose of optional means permitting a determination of the data described hereinabove. An alternative, less expensive ambience monitoring device comprises, for example, a rearwards directed camera sensor, which can also be used as a backup camera, as well as two short-range sensors arranged at the vehicle sides, which can be configured as infrared or ultrasonic sensors.

The invention provides for a lane change assist function, wherein graded measures to avoid a collision and/or to enhance the safety of the vehicle occupants in an imminent collision are initiated in conformity with the existing traffic situation. Depending on the data described hereinabove and acquired by means of the camera sensors 5, 6 due to the ambience monitoring operation, alarm signals are triggered by the danger computer and/or interventions into the steering system of the motor vehicle 1 are performed, and/or reversible and/or irreversible safety means are influenced.

It is arranged that the danger computer in a first step triggers an optical alarm signal, when a longitudinal safety distance to a detected object would not be reached due to a lane change to an adjacent target lane. The safety distance is predetermined preferably depending on the vehicle speed and e.g. corresponds to a temporal distance of roughly 1.8 seconds, that means the so-called 'half-speedometer distance' rule. It can also be provided that an optical alarm signal is triggered when a detected object is approaching in the rear of the motor vehicle 1 within the same lane at a relative speed that is higher than a predetermined threshold value. This way, the driver is made aware of an increased danger in a lane change by an optical alarm signal even when an object is approaching on the own lane that moves at a considerably higher speed than the own motor vehicle 1 so that a lane change of this object has to be expected soon.

In case no lane markings can be detected, it is determined depending on the determined and calculated relative distances of the objects with respect to the motor vehicle 1, whether a collision with an object can occur in the event of a lane change to an adjacent target lane. The first alert stage is likewise activated when the predicted longitudinal distance between the motor vehicle 1 and a detected object would decrease under the safety distance due to a lane change.

The optical alarm signal preferably is a colored light that is indicated at least in the exterior rearview mirror 7, 8 of the motor vehicle 1, which is positioned on the vehicle side on which the object that is decisive for the alarm will reach the motor vehicle 1. It is additionally provided in a favorable embodiment of the invention that a colored light is shown in both exterior rearview mirrors 7, 8 of the motor vehicle 1. In another preferred embodiment of the invention, lamp elements for the optical warning of the driver can also be integrated into the A-column of the vehicle, so that the driver can see them more easily.

The first stage is deactivated or the optical alarm is terminated, when the activation conditions described hereinabove are no longer satisfied, that means when no object is detected in the lateral rearward space 2, 3 in relation to which a safety distance would not be reached due to a lane change.

When the first alert stage is activated and the driver switches on a direction indicator on the side of the vehicle on which the object that is decisive for the alarm will reach the motor vehicle 1, a second stage is activated in which the driver is made aware of the danger situation by an audible alarm signal. Preferably, at least one loudspeaker on the vehicle side concerned is activated to emit a warning sound. The type and/or the volume of the warning sound is determined in a favorable embodiment of the invention depending on the extent by which the longitudinal safety distance to the object at issue would not be reached due to a lane change.

The audible alarm provided in the second alert stage is activated preferably in addition to the optical alarm provided in the first alert stage. Deactivation takes place in an embodiment of the invention when the driver disables again the enabled direction indicator. In another embodiment of the invention, which is appropriate above all for vehicles where the direction indicator need not be locked, but only tipped to show an intended lane change, the audible warning of the driver is terminated when no measures of a higher stage have been initiated during a predetermined interval. However, if this is the case, the audible alarm is preferably terminated together with the measures of the higher stages.

Measures of the additional stage are performed, when it is detected that the driver initiates a lane change to a target lane, on which a collision with a detected object is possible. This is preferably detected because the motor vehicle 1, at least for a predetermined period, approaches continuously the road marking 9, 10, which separates the instantaneous lane and the target lane. In addition or as an alternative, it can be provided that the initiation of a lane change is only detected when the distance between the motor vehicle 1 and this road marking has diminished under a predetermined minimum distance, which is preferably determined depending on the total width of the instantaneous lane.

If no lane markings are provided or can be determined, measures of further stages are performed when the lateral distance from a detected object, for the instant when the object will reach the motor vehicle 1, is continuously reduced within a predetermined interval and/or when this distance decreases below a predetermined additional minimum value.

When the initiation of a lane change by the driver has been detected, the danger potential for the detected object at issue is taken into account for an evaluation of the situation, and measures of a stage are initiated, which is selected depending on the danger potential.

If the danger potential is inferior to a predetermined first threshold value, a third stage is activated, where a driver warning is envisaged by way of a haptic alarm signal. To this end, a direction-changing steering torque is applied to the steering wheel of the motor vehicle 1. The steering torque favorably has a magnitude between roughly 1.5 and 4.5 Nm, preferably 3 Nm, and a frequency between 1 and 20 hertz. The frequency can be invariably predefined, it can be increasing or can be determined depending on the danger potential in a particularly advantageous embodiment of the invention. Furthermore, the amplitude of the steering torque can be determined depending on the current value of the danger potential. Preferably, the duration of the torque application is determined likewise depending on the present value of the danger potential.

Every appropriate device, which is known to the expert in the art, can be used to generate the steering torque. An example for a device of this type is an electric power steering system, wherein a steering torque is introduced by means of an electric motor into the steering line of the motor vehicle. During conventional operation, this steering torque is determined depending on the driver steering torque and the steering angle adjusted by the driver, and is used to boost the driver steering torque. However, it is also possible to activate the electric motor independently of the driver by way of an interface, for example, to a vehicle bus system such as the CAN bus (CAN: Controller Area Network) that is typically employed in vehicles, so that an additional steering torque can be introduced into the steering line irrespective of the driver specifications.

The haptic alarm is terminated when it is detected by way of the distance of the vehicle from the road marking or by way of the predicted lateral distance from the detected object being decisive for the alarm that the motor vehicle 1 is returned to its original lane or the lane change is not continued, or when the fourth stage has been activated.

The fourth stage is activated when the initiation of a lane change by the driver is detected and the danger potential for an object on the target lane exceeds the first predetermined threshold value. Measures to return the vehicle into the lane are taken in the fourth stage. Preferably, a direction-constant steering torque, which serves to return the motor vehicle 1 into the lane, is applied to the steering line or the steering wheel of the motor vehicle 1. This fourth stage is deactivated and the steering torque is reduced when it is detected by way of the distance of the motor vehicle 1 from the road marking or by way of the predicted lateral distance from the detected object decisive for the alarm that the motor vehicle 1 is returned into the original lane or the lane change is not continued, respectively, and/or when the danger potential falls below the first threshold value.

Principally, it can also be provided to return the motor vehicle 1 into the lane by setting a steering angle determined in the danger computer. Compared thereto, however, the application of a steering torque is advantageous in that the driver can ignore it and can perform the lane change despite the measures initiated by the danger computer, when so desired. He/she is hereby able, for example, when riding towards the end of a traffic jam, to avoid a frontal impact on the end of the traffic jam and prefer a lateral collision with another vehicle, which has less serious consequences in general.

With respect to situations, in which a frontal impact on an obstacle can only be prevented by a lane change, the invention preferably provides in addition that an additional object-sensing device monitors the space in front of the vehicle. This may be a distance sensor system of an ACC system (ACC: Adaptive Cruise Control) per se known to the expert in the art, for example. Distance sensors of this type allow performing a danger assessment regarding the risk of a frontal impact, in order not to perform a torque application to the steering wheel when a frontal impact is imminent and to permit the driver to swing out freely.

Preferably, an additional danger potential is determined in the danger computer from the distance and the relative speed between the motor vehicle 1 and an object being in front of the vehicle. When this danger potential exceeds a predetermined threshold value, no torque is applied in the third and fourth stage, or the third and fourth stages are not triggered. The audible alarm provided in the second stage is preferably maintained in this case, however, it can also be terminated.

When the initiation of a lane change by the driver has been detected and the danger potential exceeds a second threshold value that is higher than the first threshold value, reversible safety measures to enhance the safety of the vehicle occupants in the case of a collision are initiated within the limits of a fifth stage. This is preferably done in addition to the measures, which are taken on account of the activation of lower stages.

Further, the reversible safety measures are initiated even if an object is on a collision course with the vehicle and the time to collision does not reach a first threshold value, without initiation of a lane change by the driver having been detected.

Besides, the reversible safety measures can involve in particular an activation of electric seat belt pretensioning systems and the activation of actuators to change the seat position of the vehicle occupants. Actuators of this type are used, for example, to bring the seat back into an erect position, and the head rest and the seat cushion can be placed in a higher position in order that the vehicle occupants assume a favorable position for a collision. In addition, it can be arranged to close open windows of the motor vehicle 1 or an open sliding roof, in order to enhance the safety of the vehicle occupants.

The fifth stage is deactivated when it is detected, by way of the distance of the motor vehicle 1 from the road marking or by way of the predicted lateral distance from the detected object that is decisive for the alarm, that the motor vehicle 1 is returned into the original lane or the lane change is not continued, and/or when the danger potential falls below the second threshold value or the first threshold value. The measures taken are preferably canceled in the deactivation, that means the seat belt pretensioning system is released and the seats, the windows and the sliding roof are moved to adopt their original positions, which have been stored in a memory to this end. In order not to confuse the driver by the fact that, admittedly, the fifth stage, but not the fourth stage, is deactivated, preferably the first threshold value of the danger potential is decisive for the deactivation of the fifth stage as well as for the deactivation of the fourth stage.

When a collision is assessed as being inevitable in a lane change, which is the case when the initiation of a lane change by the driver has been detected and the danger potential exceeds a third threshold value that is higher than the second threshold value, irreversible safety means of the vehicle such as airbags or pyrotechnic seat belt pretensioning systems are influenced within the limits of a sixth stage.

Further, the irreversible safety measures are also taken when a collision with an object that is moving actively towards the vehicle on a collision course, is judged as being inevitable because the time to collision for this object has fallen below a second threshold value, which is lower than the first threshold value for the time to collision.

Irreversible safety means are usually activated depending on acceleration signals being sent from acceleration sensors and allowing the detection of a collision. It is arranged in the invention that, within the limits of the sixth stage, a preconditioning of the irreversible safety means is performed, which preferably consists in an adaptation of the release criteria. Thus, the acceleration threshold values, which are decisive for the activation of one or more air bags, can be reduced by the danger computer e.g. in the sixth stage, so that these air bags are deployed more quickly when a collision takes place. Since it can also be determined, based on the evaluation of the pictures taken by the camera sensors 5, 6, at which point and at which speed the motor vehicle 1 will be hit by an object in a collision, equally the acceleration threshold values for the deployment of air bags can be raised, which have a less significant safety relevance due to the point of impact.

The sixth stage is deactivated and the original release criteria for the irreversible safety means are re-established when it is detected, by way of the distance of the motor vehicle from the road marking or by way of the predicted lateral distance from the detected object that is decisive for the alarm, that the motor vehicle 1 is returned into the original lane or the lane change is not continued, and/or when the danger potential falls below the third threshold value.

The ambience monitoring device provided to perform the lane change assist function of the invention can also be used to realize additional assist functions. Thus, the acquired information about the distance between the motor vehicle 1 and the sensed road marking 9, 10 can be used for a function, which warns the driver irrespective of the other traffic situation when the motor vehicle 1 approaches the road markings 9, 10 or rides over the road markings 9, 10. Such a function can prevent the motor vehicle 1 from leaving its lane due to the driver being inattentive. A lane change alarm of this kind can suitably be employed in utility vehicles in particular.

In addition, a parking aid function can be performed by means of the ambience monitoring device, in which parking gaps are measured and the driver is assisted in a parking maneuver into a parking gap. The aid can e.g. consist in that, due to an application of steering torques to the steering handle of the vehicle, the driver is given steering recommendations to negotiate a previously measured parking gap, or that the steering system is controlled fully automatically by a control device during the parking maneuver.

Beside the ambience monitoring device, it is also possible to utilize the hardware used for the lane change assist function to perform additional assist functions, in particular the electronic control system provided to evaluate the camera pictures and to initiate the intended measures.

Thus, this system can perform the lane change assist function of the invention and trigger lane change alarms at high vehicle speeds based on corresponding software. At low vehicle speeds, the system can be made use of to perform a parking aid function using corresponding software.

The invention claimed is:

1. A method for avoiding a collision in a lane change maneuver of a vehicle from an instantaneous lane to a target lane, the method comprising:
   detecting objects in a lateral rearward space of the vehicle; and
   taking measures are to influence the vehicle, wherein the measures, depending on their stage, involve at least one of warning a driver, intervening into a steering system of the vehicle, and influencing a safety device, and measures of a selected stage are initiated, with the stage being determined depending on at least one of a relative position of a detected object (4) with regard to the vehicle (1) and a relative speed between the vehicle (1) and the detected object (4) as well as depending on fulfillment of a lane change condition, and wherein a steering torque that is invariable in terms of direction is applied to a steering handle in order to return the vehicle (1) completely into the instantaneous lane or to keep it in the lane when, on account of a lane change to the target lane, the longitudinal distance between the vehicle (1) and the object (4) detected within the target lane would become shorter than a predetermined minimum distance, when a second lane change condition is satisfied, and when the danger potential exceeds a first threshold value.

2. The method of claim 1, further comprising: sensing a rearward space of the vehicle to determine a shape of the road in the rearward space of the vehicle (1).

3. The method of claim 2, further comprising: predicting a path of the detected object (4) depending on the position of the detected object (4) with regard to the vehicle (1), the relative speed between the detected object (4) and the vehicle (1), and the shape of the road.

4. The method of claim 2, further comprising: allocating a detected object (4) is allocated to the target lane based on a relative position of the object (4) with regard to the vehicle (1) and based on the shape of the road.

5. The method of claim 1, further comprising: sensing a road marking (9; 10) separating the instantaneous lane of the vehicle (1) from the target lane.

6. The method of claim 5, wherein a second lane change condition is satisfied when a distance between the vehicle (1) and the road marking (9; 10) decreases during a predetermined period or below a predetermined minimum distance.

7. The method of claim 1, further comprising: triggering an alarm signal when, on account of a lane change to the target lane, a longitudinal distance between the vehicle (1) and an object (4) detected within the target lane would become shorter than a predetermined minimum distance.

8. The method of claim 1, wherein the lane change condition is satisfied when a driver activates a direction sign on the vehicle side directed towards the target lane.

9. The method of claim 1, further comprising: triggering a haptic alarm signal when, due to a lane change to the target lane, a longitudinal distance between the vehicle (1) and the object (4) detected within the target lane would become shorter than a predetermined minimum distance and when a second lane change condition is satisfied.

10. The method of claim 9, wherein the haptic alarm signal is triggered because a steering torque that changes the direction is applied to a steering handle of the vehicle (1).

11. The method of claim 1, wherein a second lane change condition is satisfied when a lateral distance between the vehicle (1) and a detected object (4) that is allocated to the target lane decreases during a predetermined period and/or below a predetermined minimum distance.

12. The method of claim 1, further comprising: determining a danger potential depending on the longitudinal distance, which would develop due to a lane change to the target lane between the vehicle (1) and the object (4) detected within the target lane, and depending on a relative speed between the vehicle (1) and the detected object (4).

13. The method of claim 12, further comprising: determining a position of the vehicle within a lane based on a shape of a road, and determining a danger potential depending on the position of the vehicle (1) in the lane.

14. The method of claim 13, wherein the danger potential is determined based on at least one of the speed of the vehicle, a yaw rate of the vehicle, a steering angle of steerable wheels of the vehicle, a steering angle velocity, or a steering torque generated by a driver of the vehicle.

15. The method of claim 1, further comprising: detecting a distance between the vehicle (1) and an object in a space in front of the vehicle (1), and applying a direction-constant torque to a steering handle only when no object is detected in front of the vehicle, whose distance from the vehicle (1) is shorter than a predetermined minimum distance.

16. The method claim 1, wherein the minimum distance is determined depending on a relative speed between the vehicle (1) and an object detected in the space in front of the vehicle (1).

17. The method of claim 1, further comprising: influencing at least one reversible safety element of the vehicle (1) when, on account of a lane change to the target lane, the longitudinal distance between the vehicle (1) and an object (4) detected within the target lane would become shorter than a predetermined minimum distance, when a second lane change condition is satisfied and when the danger potential exceeds a second threshold value.

18. The method of claim 17, wherein the second threshold value is higher than the first threshold value.

19. The method of claim 17, further comprising: influencing at least one reversible safety element of the vehicle (1) is influenced when it is found out on account of the predicted path of the object that the object is on a collision course with the vehicle (1) and a collision with the vehicle (1) has to be expected within a first time to collision.

20. The method of claim 19, wherein the reversible safety element is a reversible seat-belt pretensioning system.

21. The method of claim 19, wherein the reversible safety element is at least one actuator serving to change a seat position of a driver or passenger of the vehicle (1).

22. The method of claim 19, wherein the reversible safety element is at least one actuator serving to close a sliding roof or a window of the vehicle (1).

23. The method of claim 17, further comprising: influencing at least one irreversible safety element of the vehicle (1) when, on account of a lane change to the target lane, the longitudinal distance between the vehicle (1) and the object detected within the target lane would become shorter than a predetermined minimum distance, when a second lane change condition is satisfied and when the danger potential exceeds a third threshold value.

24. The method of claim 1, further comprising: influencing at least one irreversible safety element of the vehicle (1) when it is detected on account of the predicted path of the object that the object is on a collision course with the vehicle (1) and a collision with the vehicle (1) has to be expected within a second time to collision.

25. The method of claim 24, wherein the second collision period is shorter than the first time to collision.

26. The method of claim 24, wherein the irreversible safety element is influenced by changing activation criteria of the irreversible safety element.

27. The method of claim 24, wherein the irreversible safety element is an air bag.

28. A device for avoiding a collision in a lane change maneuver of a vehicle to a target lane, the device comprising:
an ambience monitoring device that is used to sense objects in a rearward space of the vehicle;
a danger computer that initiates graded measures to influence the vehicle (1), with the graded measures, corresponding to a respective stages, including at least one of warning a driver, intervening into a steering system of the vehicle (1), and influencing a safety element, wherein the danger computer initiates measures of a stage, which can be determined depending on at least one of a relative position of a detected object (4) with regard to the vehicle (1) or a relative speed between the vehicle (1) and the detected object (4), and also depends on a fulfillment of a lane change condition, and wherein a steering torque that is invariable in terms of direction is applied to a steering handle in order to return the vehicle (1) completely into the instantaneous lane or to keep it in the lane when, on account of a lane change to the target lane, the longitudinal distance between the vehicle (1) and the object (4) detected within the target lane would become shorter than a predetermined minimum distance, when a second lane change condition is satisfied, and when the danger potential exceeds a first threshold value.

29. The device of claim 28, wherein the ambience monitoring device (5; 6) is a camera system having two camera sensors (5, 6).

30. The device of claim 29, wherein one camera sensor (5; 6) is arranged at a vehicle side.

31. The device of claim 30, wherein the camera sensors (5, 6) are integrated into the exterior rearview mirrors (7, 8) of the vehicle (1).

32. The device of claim 28, wherein the ambience monitoring device includes a camera sensor directed to a rearward space of the vehicle (1) and a short-range sensor on each vehicle side, and objects in a lateral area of the vehicle can be detected by the short-range sensors.

33. The device of claim 28, wherein the ambience monitoring device can be employed to measure a parking gap.

34. The device of claim 28, wherein the danger computer determines a size of a parking gap.

35. The device of claim 34, wherein the danger computer determines a path of the vehicle (1) for negotiating the parking gap starting from a start position by way of signals from the monitoring device.

* * * * *